United States Patent [19]
Berkey et al.

[11] Patent Number: 5,152,818
[45] Date of Patent: Oct. 6, 1992

[54] METHOD OF MAKING POLARIZATION RETAINING FIBER

[75] Inventors: George E. Berkey, Pine City; Venkata A. Bhagavatula, Big Flats; Robert M. Hawk, Bath; Steven H. Tarcza, Painted Post, all of N.Y.

[73] Assignee: Corning Incorporated, Corning, N.Y.

[21] Appl. No.: 612,103

[22] Filed: Nov. 9, 1990

[51] Int. Cl.$^5$ ............................................. C03C 25/02
[52] U.S. Cl. ........................................ 65/3.11; 65/13; 65/36; 65/42; 385/126
[58] Field of Search ............... 65/3.12, 18.2, DIG. 16, 65/13, 3.11, 3.15, 42, 36; 350/96.30, 96.33; 385/126

[56] References Cited

U.S. PATENT DOCUMENTS

| | | | |
|---|---|---|---|
| 4,561,871 | 12/1985 | Berkey | 65/3.11 |
| 4,630,889 | 12/1986 | Hicks | 350/96.30 |
| 4,978,377 | 12/1990 | Brehm | 350/96.33 X |

Primary Examiner—Robert L. Lindsay
Attorney, Agent, or Firm—William J. Simmons, Jr.

[57] ABSTRACT

Disclosed is a method of making a polarization retaining single-mode optical fiber. Longitudinal grooves are formed on opposite sides of a cylindrically-shaped core perform having a glass core surrounded by cladding glass. The core preform is inserted into a glass tube, the tube is shrunk onto the core preform, and the interface between the core preform and the tube is fused to form a solid preform having longitudinal apertures on opposite sides of the core. An etchant gas is flowed through the apertures to enlarge the apertures into holes having a substantially round cross-section. Inserted into each aperture is a stress rod formed of glass having a coefficient of expansion different from that of the cladding glass. The resultant draw blank is drawn to form a single-mode optical fiber having a core that is subjected to a stress-induced birefringence.

24 Claims, 3 Drawing Sheets

METHOD OF MAKING POLARIZATION RETAINING FIBER

BACKGROUND OF THE INVENTION

This invention relates to a method of making polarization retaining single-mode optical fibers, and relates particularly to a method of making a preform from which such fibers can be drawn.

In many applications of single-mode optical fibers, eg. gyroscopes, sensors and the like, it is important that the propagating optical signal retain the polarization characteristics of the input light in the presence of external depolarizing perturbations. This requires the waveguide to have an azimuthal asymmetry of the refractive index profile.

A stress birefringent optical fiber having extremely good polarization retaining characteristics is disclosed in U.S. Pat. No. 4,478,489. The refractive index asymmetry is obtained by introducing into the cladding region of the fiber on opposite sides of the core longitudinally extending regions of glass having a thermal coefficient of expansion (TCE) different from that of the cladding.

Stress birefringent single-mode fibers have been fabricated by a multiple-rod-in-tube technique for several years. One of the disadvantages of this technique is the occurrence of seeds in the fiber due to the many surfaces in the preform from which the fiber is drawn. A further disadvantage is the long duration of the sealing technique that is required to prevent the low melting point stress rod material from flowing laterally between adjacent cladding rods to azimuthal regions of the fiber other than the stress rod regions. The sealing process involves traversing a flame along a rod-in-tube assembly two or three times, each traverse lasting 45 to 60 minutes. Even after subjecting the assembly to the sealing process, stress rod material sometimes leaks past adjacent cladding rods.

The aforementioned lateral leakage problem can be avoided by the method disclosed in U.S. Pat. No. 4,561,871. Longitudinally extending holes are drilled on opposite sides of the core of a single-mode fiber preform. Stress rods are inserted into the holes, and the preform is drawn into a fiber. However, it has been very difficult to drill two holes that are parallel with the core and are not skewed. Also, the rough surfaces of the holes tend to cause seeds. An object of the invention is to provide a method of making cylindrical glass articles having at least one aperture parallel to the longitudinal axis.

A preferred stress rod material comprises $SiO_2$ doped with an amount of $B_2O_3$ to increase the TCE to a value sufficiently above that of the cladding glass. This dopant is advantageous in that its refractive index is lower than that of silica cladding glass; $B_2O_3$-containing stress rods can therefore be located relatively close to the fiber core. Although polarization retaining single-mode optical fibers have been made with stress rods formed of $SiO_2$ doped with less than 20 wt. % $B_2O_3$, the stress rods generally contain at least 20 wt. % $B_2O_3$ to ensure good polarization retaining properties. Stress rods formed of $SiO_2$ doped with as little as 15 wt. % $B_2O_3$ have a very low viscosity at fiber draw temperatures and would run from the bottom of the preform if they were not prevented from doing so. During the drawing process, the stress rod glass can also be squeezed upwardly from the top of the draw blank as the draw blank diameter is decreased in the root portion. This can alter the geometry of the core and/or the stress rods in the drawn fiber and can result in non-uniform stress on the core. A technique is needed for preventing the flow of stress rod glass from either end of the blank during the fiber drawing process. Another object of the invention is to provide a method of making a stress birefringent optical fiber containing stress rods of glass having very low viscosity at draw temperature.

Optical quality stress rods can be formed by a flame oxidation process whereby glass particles (sometimes called soot) are deposited on a temporary mandrel having a tubular handle at one end. The soot is also deposited over the end portion of the handle so that, after a sufficiently thick coating has been deposited, the porous preform and handle can be removed from the mandrel as a unit. The handle supports the porous preform during further processing. The porous preform is consolidated to a tubular glass preform which is removed from the consolidation furnace and stretched to close the aperture and form an elongated rod. When conventional techniques are employed to form rods comprising $SiO_2$ doped with at least 15 wt. % $B_2O_3$, the bridging layer of soot at the end of the handle tends to break; the porous preform therefore releases from the handle. The proper bridging of the soot preform to the handle is referred to as healing. Furthermore, the consolidated high expansion borosilicate glass preform can crack from the handle. In addition, a high expansion layer that forms on the aperture surface of the consolidated preform can cause the preform to break upon cooling. It is therefore an object of the invention to provide an improved method of making borosilicate rods having at least 15 wt. % $B_2O_3$.

SUMMARY OF THE INVENTION

A further object of the invention to provide a method of making polarization retaining single-mode optical fibers, which method overcomes the disadvantages of the prior art. Yet another object is to provide a method of making polarization retaining single-mode optical fibers, which method is relatively simple to practice and can employ glasses which do not detrimentally affect light attenuation.

One aspect of the invention involves a method of making a polarization retaining single-mode optical fiber having stress rods on opposite sides of the core for inducing an asymmetry of the refractive index profile. Longitudinal grooves are formed on opposite sides of a cylindrical core preform having a glass core surrounded by cladding glass. The core preform is inserted into a glass tube to form an assembly having longitudinal apertures on opposite sides of the core. Inserted into each of the apertures is a stress rod having a TCE different from that of the cladding glass. The resultant draw blank is drawn to form an optical fiber.

The tube is preferably shrunk onto the core preform to form a solid preform containing the longitudinal apertures. This can be accomplished by depositing glass soot on the outer surface of the tube, heating the assembly formed by inserting the core preform into the tube to consolidate the soot, the process of consolidating the soot exerting a force radially inwardly on the tube, causing the tube to shrink onto the core preform, the step of heating fusing the tube to the rod. The cross-sectional area of the apertures can be enlarged by a suitable technique such as flowing an etchant through the apertures. The step of flowing can be continued for a period of time sufficient to change the cross-sectional shape of the aperture to a substantially circular shape, thus enabling the use of round stress rods which are relatively easily formed.

The space between the stress rods and the surface of the cladding glass that forms the apertures is preferably evacuated while the draw blank is heated and evacuated to fuse each of the stress rods to the surface of the aperture into which it has been inserted.

The stress rods are preferably shorter than the preform aperture. A glass plug is inserted into each aperture at each end of a stress rod, and the plugs are attached to the draw blank to prevent the stress rod from melting and flowing from the aperture during the step of drawing.

A composite rod can be formed by attaching to each end of the stress rod a glass plug, the TCE of which is intermediate that of the cladding glass and the stress rod. The composite rod is inserted into the aperture. The length of the stress rod is such that a portion of a plug is within the aperture at each end of a stress rod. The plugs are attached to the draw blank to prevent the stress rod from melting and flowing from the aperture during the step of drawing.

When the draw blank is inserted into the entrance region of the draw furnace, a vacuum attachment can be attached thereto to evacuate the space between the stress rods and the surface of the cladding glass that forms the apertures. The draw blank is passed through the furnace hot zone at a rate fast enough to prevent its elongation, the rate of insertion and the temperature of the hot zone being sufficient to fuse each stress rod to its respective aperture surface. The draw blank is withdrawn back to the entrance zone. If necessary, the hot zone temperature is increased to draw temperature. Thereafter, an end of the draw blank is introduced into the hot zone, and an optical fiber is drawn.

Another aspect of the invention concerns the use of preforms having longitudinal apertures formed by methods other than the preferred technique described above. For example, longitudinal holes can be formed on opposite sides of the core by drilling or the like. The stress rods are inserted into each aperture. The space between the stress rods and the cladding glass is evacuated, and the stress rods are fused to the preform. The resultant draw blank is drawn to form an optical fiber.

The invention further pertains to a method of forming a cylindrical glass article having at least one aperture that is parallel to the article's longitudinal axis. Formed along one side of a cylindrically-shaped glass rod is a longitudinal groove that is parallel to the axis. The rod is inserted into a glass tube, and the tube is shrunk onto the rod.

Yet another aspect of the invention is a method of forming an elongated borosilicate glass article comprising at least 15 wt. % $B_2O_3$. A stream of glass particles containing the appropriate concentration of $B_2O_3$ is directed toward a rotating mandrel to build up a porous glass coating. Deposition conditions are such as to preclude the sintering of the soot during deposition. The mandrel is removed from the preform to form a tubular porous preform which is heated to consolidate it to a dense glass preform having an axial aperture. $NF_3$ is flowed through the aperture while the temperature of the consolidated preform is maintained above 600° C. but below that temperature which would cause the substantial elongation of the blank. This etching step removes from the aperture surface a layer of high expansion material that would have caused the consolidated blank to break when it was removed from the consolidation furnace. The resultant article is optionally etched with $SF_6$ to provide a smoother surface. The resultant tubular dense glass preform can be stretched and collapsed to form a solid glass rod.

Since consolidated high $B_2O_3$ content borosilicate glass soot does not heal properly to the handle during deposition, and since consolidated high $B_2O_3$ content borosilicate glass preforms can crack from the handle, it is advantageous to initially adjust the composition of the particulate glass stream to form on the mandrel and the handle a porous glass coating, the inner region of which contains a sufficiently high concentration of $SiO_2$ that these problems are alleviated. The composition of the remainder of the preform provides the desired expansion properties.

DESCRIPTION OF THE PREFERRED EMBODIMENT

It is to be noted that the drawings are illustrative and symbolic of the invention, and there is no intention to indicate scale or relative proportions of the elements shown therein.

Figure 1:
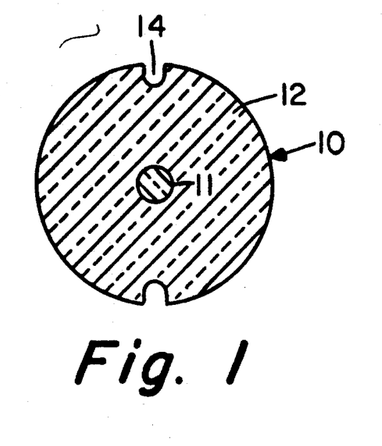
FIG. 1 is a cross-sectional view of a grooved core preform.

Referring to FIG. 1, there is initially provided a glass single-mode core preform 10, i.e. a preform in which the ratio of the diameter of core 11 to the diameter of cladding 12 is greater than that which is required to draw a single-mode fiber from the preform. In order to form a single-mode optical fiber from such a core preform, it is conventionally overclad with additional cladding glass to provide the desired ratio of core diameter to cladding diameter. Preform 10 can be made by any known technique such as modified chemical vapor deposition (MCVD), vapor axial deposition (VAD) and outside vapor deposition (OVD). Whereas core 11 is illustrated as having a circular cross-section, it could have a non-circular cross-section such as oblong. The refractive index profile of the core can be step-type, graded or the like.

Longitudinally-extending grooves 14 are formed in cladding 12 on opposite sides of core 11 by means such as grinding, sawing or the like. If the diameter of the grooved core preform too large for subsequent processing, it is inserted into the apparatus of FIG. 2, a conventional draw furnace wherein its tip is heated by means 18. One end of silica rod 19 is fused to the lower end of the preform, and the other end of the rod is engaged by motor-driven tractor 20. A grooved rod 21 having a core 11', cladding 12' and longitudinal grooves 14' is drawn.

Figure 3:
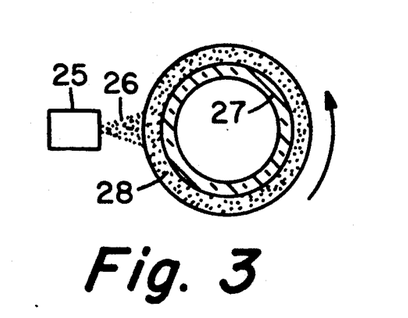
FIG. 3 illustrates the application of a coatings of glass particles to a glass tube.
Figure 4:
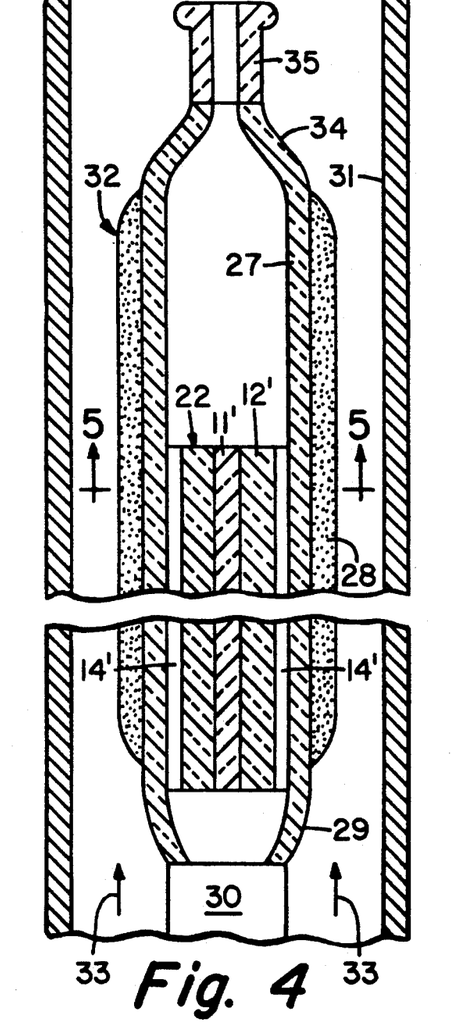
FIG. 4 is a cross-sectional view illustrating the consolidation and fusion of a first assembly.
Figure 5:
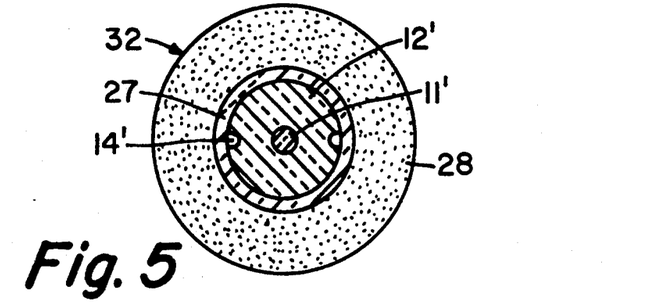
FIG. 5 is a cross-sectional view taken along lines 5—5 of FIG. 4.

An end 29 of cladding tube 27 is tapered as shown in FIG. 4, and a glass plug 30 is fused to the tapered end. Referring to FIG. 3, the ends of tube 27 are then mounted in a lathe where it is rotated and translated with respect to soot deposition means 25. Particles 26 of glass soot are deposited on tube 27 to build up coating 28. Soot 26 preferably has the same composition as tube 27, $SiO_2$ being a preferred composition for stress rod polarization retaining optical fibers.

As shown in FIG. 4, a section 22 of the grooved rod 21 is inserted into the end of tube 27 opposite tapered end 29 until it contacts the tapered end, thereby forming assembly 32. End 34 of tube 27 is tapered and is then fused to handle 35. While assembly 32 is lowered into consolidation furnace muffle 31, a drying gas flows upwardly through the muffle (arrows 33). The drying gas conventionally comprises a mixture of chlorine and an inert gas such as helium.

Figure 7:
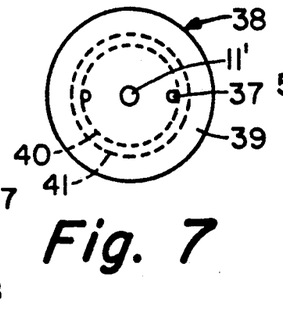
FIG. 7 is a cross-sectional view of a preform resulting from the consolidation/fusion step illustrated in FIG. 4.

As soot coating 28 consolidates, it exerts a force radially inwardly on tube 27, thereby forcing that tube inwardly against section 22. A lower density soot will provide a greater force; however, the soot coating must be sufficiently dense to prevent cracking. As shown in FIG. 7, the resultant consolidated assembly 38 comprises core 11' surrounded by cladding 39. The original cladding region 12 and tube 27 are completely fused at dashed line 40. Porous glass coating 28 has become completely consolidated and fused to tube 27 as indicated by dashed line 41. Grooves 14' have become apertures 37 which are parallel to the longitudinal axis of assembly 38.

Figure 6:
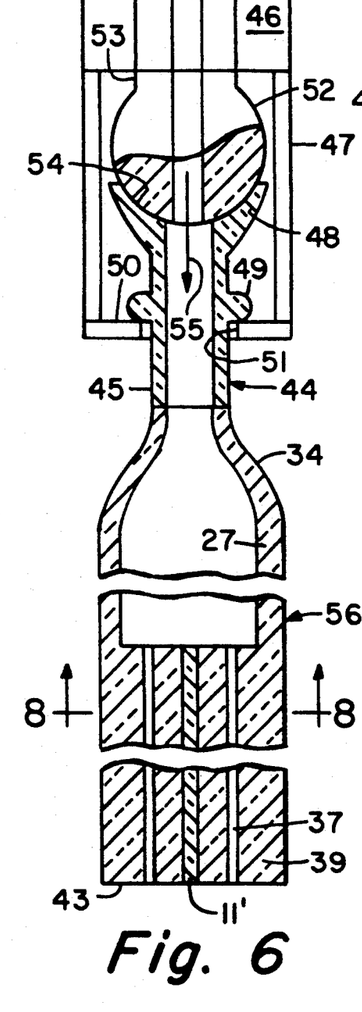
FIG. 6 illustrates the connection of a ball joint gas conducting handle to the collapsed preform resulting from the step illustrated in FIG. 4.

After consolidation, the end of preform 32 containing tapered end 29 is severed to form planar endface 43 (FIG. 6). Tapered region 34 is severed from handle 35 and is fused to gas-conducting handle 44 to form preform 56. Handle 44 comprises glass tube 45 having a flared joint 48 at its upper end and an annular enlargement 49 spaced from the joint 48. Support tube 46 has a slotted handle formed in the end thereof. One side of end region 47 of tube 46 is removed to accept the upper end of handle 44, enlargement 49 resting on slotted base 50 as the adjacent section of tube 45 is inserted into slot 51. At the end of gas conducting tube 53 is a ball joint 52 which fits into cavity 54 of joint 48.

Preform 56 is lowered into consolidation furnace muffle 31 while an etchant gas such as $NF_3$, $SF_6$ or the like flows into the top of tube 27 from tube 53 (arrow 55) and through apertures 37, thereby etching the aperture walls in the heated region of the assembly. A preferred furnace is the scanning consolidation furnace disclosed in U.S. Pat. No. 4,741,748 (Lane et al.). Such a furnace is capable of providing a sharp hot zone, and its temperature is readily adjustable. The etching process can be employed to merely smooth the aperture surfaces, or it can enlarge the apertures. The size of the hole formed by the etching process depends on temperature, etchant flow rate and rate at which the heating coil scans upwardly along the preform.

Figure 8:
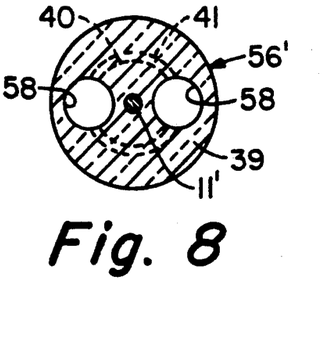
FIG. 8 is a cross-sectional view illustrating the enlarged holes produced by the etching step to which the preform of FIG. 6 is subjected.

Etching with $NF_3$ can result in the formation of a preform 56 having substantially round holes 58 (FIG. 8).

Apertures 14' could also be enlarged by mounting the ends of consolidated assembly 38 in a lathe, passing the etchant gas through the apertures, and heating incremental regions of the assembly by traversing a flame along the surface thereof.

To form a stress rod polarization retaining optical fiber from preform 56, glass rods having the required TCE are inserted into holes 58 and the resulting assembly is mounted in a draw furnace where it is drawn into a fiber. The TCE of the rods must be sufficiently different from that of cladding 39 to induce a predetermined azimuthal asymmetry of the refractive index profile in the resultant fiber. If cladding glass 39 is formed of $SiO_2$, for example, rods 62 can be formed of $SiO_3$ doped with an oxide such as $B_2O_3$, $Al_2O_3$ or the like which provides the resultant glass with a TCE greater than that of $SiO_2$. As stated above, certain stress rod compositions, such as those containing at least 15 wt. % $B_2O_3$, provide good optical characteristics but have a very low viscosity at fiber draw temperatures. During the drawing process such stress rod glass can run from the bottom of the draw blank and can also be squeezed upwardly from the top of the draw blank if it is not prevented from doing so.

In a preferred technique for containing the low viscosity stress rod glass within holes 58 during the drawing process, both ends of the borosilicate stress rods are fixed to the preform. If a high boron content stress rod were fused directly to the silica cladding portion of the preform, it would readily fracture when it cooled. Therefore, glass end rods having lower TCE than the stress rod are attached to the ends of the stress rod, and the end rods are fused to the preform. For example, if an end rod of silica doped with approximately 7 wt. % $B_2O_3$ is fused to the silica preform, the combination will not fracture when it cools. However, a borosilicate end rod cannot be fused directly to the end of a high $B_2O_3$ content stress rod if the $B_2O_3$ contents of the two rods differ by more than about 10 WC. %, because of the expansion mismatch between the two rods. To alleviate this problem, glass rods having progressively lower TCE are attached to the stress rod. Thus, sections 63 and 64 of intermediate $B_2O_2$ content are employed to connect end rods 65 and 66 to stress rods 62. For example, two stress rods 62 are cut to lengths required to form modified preform 61 of FIG. 9. Fused to opposite ends of each rod 62 are very short sections 63 and 64 of glass having a TCE lower than that of rods 62. Fused to sections 63 and 64 are short rods 65 and 66, respectively, of glass having a TCE between that of sections 63 and 64 and that of the cladding glass. If rods 62 of $SiO_2$ doped with 25 wt. % $B_2O_3$ are to be fused to rods 65 and 66 of $SiO_2$ doped with 7 wt. % $B_2O_3$, sections 63 and 64 could be formed of $SiO_2$ doped with 15–17 wt. % $B_2O_3$. To attach sections 63 and 64 to rod 62, a rod of lower TCE glass having the same diameter as rod 62 is fused to the end of rod 62, and the attached rod is scored and broken to provide a section 63 or 64 of desired length. This process is repeated to attach rods 65 and 66. During this attachment process, any bulges are eliminated by heating and pulling to reduce the diameter to one that is equal to or smaller than that of rod 62. After sections 63, 64 and rods 65, 66 are attached, rods 62 are inserted into holes 58 until the ends of rods 65 are flush with endface 43'. Sections 63 and 64 can be a few millimeters in axial length. The combined lengths of rods 62 and 65 and sections 63 and 64 should be such that the interface between section 64 and rod 62 is located within cladding glass 39 just below endface 67. The interface between rods 66 and regions 64 is preferably located within hole 58 as shown. Rods 66 should extend a sufficient distance beyond endface 67 that tube 27 can be locally heated and readily deform inwardly and fuse to regions 68 of rods 66. Additionally, a flame is preferably directed onto the interface between rods 65 and endface 43' to prevent premature sagging of the stress rods beyond endface 43' in the draw furnace.

The resultant assembly is then dried by placing it in an oven. Drying can be facilitated by attaching a hose to an end of the assembly and flowing a dry gas such as air, oxygen, nitrogen or the like through it.

The resultant draw blank is inserted in a draw furnace, and a vacuum attachment is connected to handle 74. The end of the blank is then sealed; this can be accomplished by heating the end of the blank and dropping a gob therefrom. A vacuum is then applied to tube 34. The rods are fused to the cladding glass prior to the drawing operation. This can be accomplished by passing the draw blank rapidly down through the hot zone of a furnace heated to draw temperature and then rapidly bringing it rapidly back through the hot zone. The blank can be visually inspected, and the procedure can be repeated if inspection reveals incomplete fusion of the rods to the blank. In an alternative method the draw blank is lowered more slowly through a hot zone which is a few hundred degrees below draw temperature. For example, a high silica content draw blank could be inserted through a 1750° C. furnace hot zone at a rate of 5 cm/min.

Figure 9:
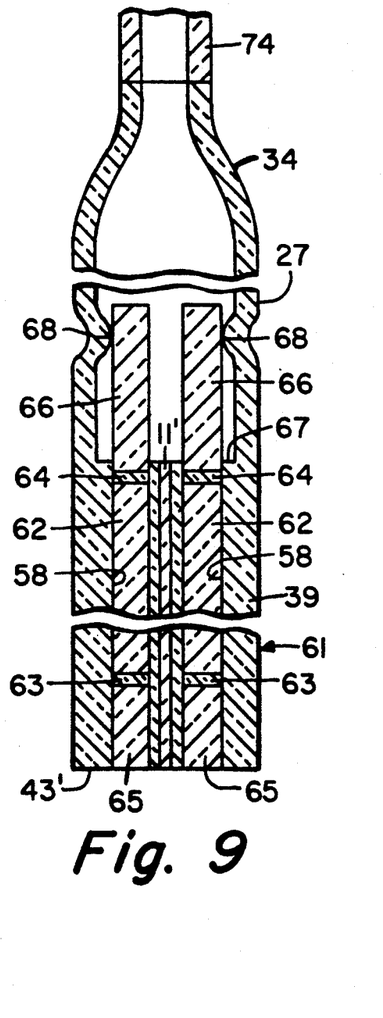
FIG. 9 is a cross-sectional view illustrating the process of making a draw blank having contained stress rods.

During the fusing operation, rods 65 and at least a portion of rods 66 fuse to cladding glass 39, thereby preventing the escape of the low viscosity glass from the preform during the high temperature draw process.

Figure 10:
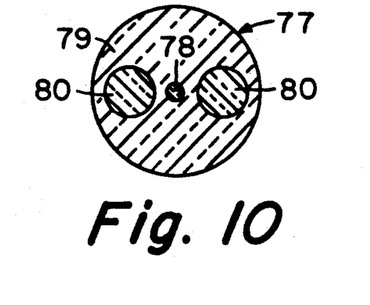
FIG. 10 is a cross-sectional view of a polarization retaining single-mode fiber produced by the present method.

If necessary, the furnace temperature is raised to draw temperature, and optical fiber 77 of FIG. 10 is drawn. Draw temperature is typically about 2050°–2150° C. for high silica content draw blanks. Fiber 77 comprises core 78, cladding 79 and a stress rod 80 on opposite sides of core 78.

The combined thicknesses of tube 27 and soot coating 28 are sufficient that, when combined with the thickness of preform cladding layer 12, the resultant optical fiber exhibits the desired single-mode properties. The thickness of cladding layer 12 is sufficient to locate apertures 14' the proper distance from core 11. This distance depends upon the composition and cross-sectional area of the stress rods.

Instead of employing soot coating 28 to exert the necessary force to cause complete fusion of tube 27 to preform 10, a low level vacuum could be applied to tube 27 while the assembly of core preform 10 and tube 27 is gradually inserted into a furnace having a narrow hot zone. A vacuum attachment would be affixed to one end of the assembly, and the grooves could be sealed at the opposite end. Alternatively, the ends of tube 27 could be sealed in a chamber that applies pressure to the outside walls of the tube. As tube 27 is heated, the pressure collapses it onto preform 10.

The previously described method whereby apertures 37 are enlarged and rounded is advantageous in that it permits the use of round stress rods 62. Processes such as the outside vapor phase oxidation process, which result in the formation of very pure glass rods, easily form round rods. Altering the shape of round rods to shapes such as square, U-shaped, V-shaped or the like, increases the expense of the rods and can result in surface defects that can cause seeds in the resultant fiber. However, fibers having non-circular stress rods can be formed by the present method.

Figure 11:
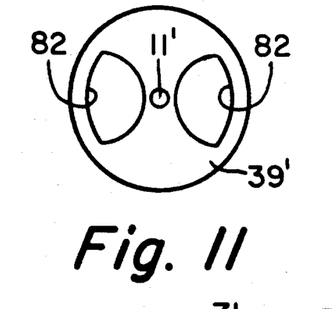
FIGS. 11–13 illustrate various stress rod geometries.
Figure 12:
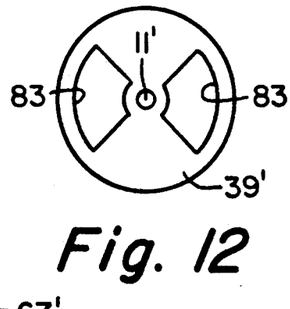
Figure 13:
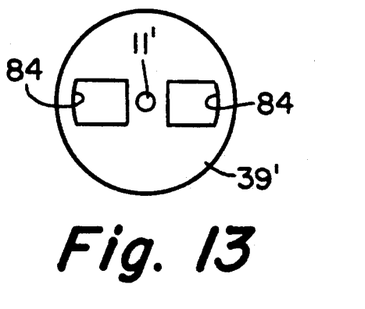

Preforms having non-circular holes are shown in FIGS. 11, 12 and 13 wherein elements similar to those of FIG. 8 are represented by primed reference numerals. Holes 82 are formed by grinding U-shaped grooves in a core preform, inserting the preform into a tube, and then heating the assembly to collapse the tube and shrink it onto the preform. Holes 83 and 84 are similarly formed except that the core preform is initially provided with V-shaped and square grooves, respectively. If desired, the holes could be subjected to a mild etch to smooth the walls thereof. To form fibers from the preforms of FIG. 11, 12 and 13, rods having the same cross-sectional shape as the holes can be inserted into the holes, and the resultant assemblies can be drawn. Alternatively, circular rods of glass having a melting point much lower than that of cladding 39' can be employed. As the fiber is drawn, the ends of the rods that are in the hot zone melt and fill the holes. This technique is disadvantageous in that a very slow draw rate is required.

Figure 14:
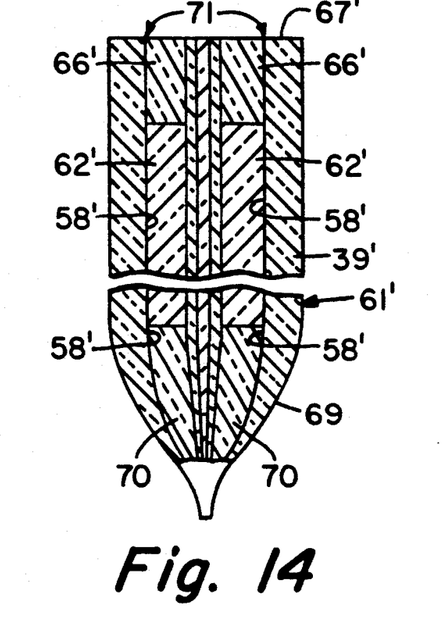
FIG. 14 is a cross-sectional view illustrating a modification of the process of FIG. 9.

Techniques other than those discussed in conjunction with FIG. 9 can be used to retain the high TCE, low melting point glass in the holes. In the embodiment of FIG. 14, elements similar to those of FIG. 9 are represented by primed reference numerals. Short rods of cladding glass composition are inserted into the longitudinal center of the preform shown in FIG. 8. A flame is directed onto the preform at the center of the rods, and the two ends are pulled in opposite directions to stretch and sever the preform into two modified preforms 61', one of which is shown in FIG. 14. Tapered end 69 contains plugs 70. If a tube 27 is attached to the preform, it is severed to form an endface 67' that extends across the entire end of the preform. Rods 62' of stress glass composition are inserted into holes 58' until they reach plugs 70. Rods 66', which are preferably formed of cladding glass, are then inserted. The endfaces of rods 66' are at or near endface 67'. At least one point 71 along the interface between each rod 66' and endface 67' is then fused to prevent longitudinal movement of rods 66'. A tapered end tube (see tube 27, 34 of FIG. 6) and evacuation handle (see handle 44) can then be attached to endface 67', and the resultant assembly can be dried and drawn into a fiber as described above.

In yet another embodiment, the end of preform 56 (FIG. 8) is tapered by suspending it in a draw furnace until the bottom end sags and becomes detached. The end of the resultant tapered portion is broken off to form a small diameter end in which holes 58 are not quite closed. The tapered region 34 of tube 27 is severed to permit the insertion of the stress rods. The end of tube 27 is thereafter tapered inwardly so that a handle can be fused thereto. A hose can be connected to the tapered end so that dry gas can be flowed into the small diameter ends of holes 58 along the space between the holes and the stress rods to dry the assembly. A torch can then be directed at the tapered end to close the small diameter ends of the holes.

Figure 15:
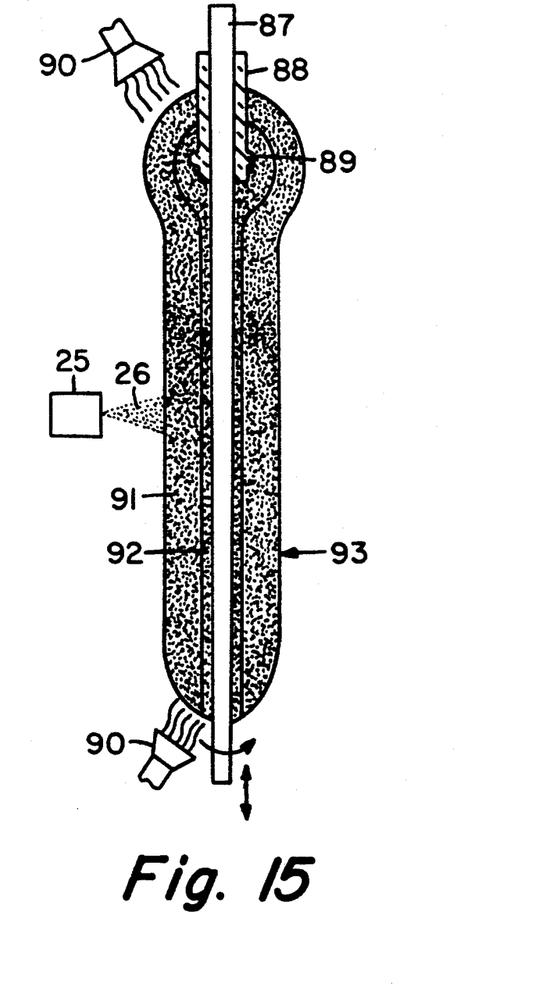
FIG. 15 is a cross-sectional view illustrating the application of first and second coatings of porous glass to a mandrel.

Apparatus of the type shown in FIG. 15 can be employed to make the stress rods, special soot laydown and consolidation steps being required to make rods comprising $SiO_2$ doped with 15 wt. % or more $B_2O_3$. The large diameter end of a tapered mandrel is inserted into a glass tube 88, and the ends of the mandrel are mounted in a lathe where it is rotated and translated. Borosilicate glass compositions containing at least about 15 wt. % $B_2O_3$ readily sinter during laydown. Therefore, burner traverse rate, burner-to-mandrel distance and flame gas flows must be such as to provide relatively cool laydown conditions which preclude sintering of the soot deposited by the burner. When conventional traverse speed (1.6 cm/sec) is used in both directions, ripples are produced. The burner should traverse the mandrel at a conventional rate in one direction, and its return speed should be much greater. Appropriate reactant vapors are fed to the burner at sufficient rates to generate soot having the desired concentrations of $SiO_2$ and $B_2O_3$. As described above, it is advantageous to initially produce soot doped with less $B_2O_3$ than the concentration required for the stress rods. After a sufficiently thick graded expansion layer has been deposited, the $B_2O_3$ can flow at a substantially constant rate throughout the remainder of the run. The high $B_2O_3$ content outer layer will be located close to the core where it will have the greatest effect on birefringence.

After the preform is removed from the lathe, the mandrel is removed, and a gas conducting handle is flameworked to the end of tube 88. The preform is then dried and consolidated. A suitable furnace is the aforementioned scanning consolidation furnace disclosed in U.S. Pat. No. 4,741,748. A drying gas comprising helium and chlorine flows through the handle and into the preform aperture, and an inert muffle gas flows upwardly through the muffle. The preform is lowered into position in the muffle where it is consolidated by a moving hot zone.

A thin layer of very high expansion material develops on the surface of the preform aperture during consolidation. If it were allowed to remain, the consolidated preform would fracture when removed from the consolidation furnace. This high expansion layer can be quickly removed by flowing $NF_3$ through the aperture while the preform remains in the furnace muffle which is still hot form the consolidation process. The preform is raised a sufficient distance to move the support handle from the heated region of the muffle, thereby preventing that handle from being damaged by the etching process. Because it is extremely reactive, $NF_3$ etches the entire length of the consolidated preform.

The $NF_3$ etch leaves a relatively unpolished surface. Thus, after the aperture is enlarged and the deleterious high expansion material has been removed, the aperture surface is subjected to an etchant gas comprising $SF_6$ to provide a very smooth surface. To perform the $SF_6$ etch, the consolidated preform is lowered to the original consolidation position of the furnace, and a gas mixture comprising $SF_6$ is flowed through the aperture. During this $SF_6$ etch, a relatively low temperature hot zone (approximately 1040° C. has been found to be adequate) scans the preform. The hot zone temperature is sufficiently low that only a small amount of the $SF_6$ fractionates; this gas therefore removes very little material from the aperture surface. The $SF_6$ etch is not critical; a consolidated preform that has not been subjected to that etch can be removed from the consolidation furnace without fracturing.

Figure 2:
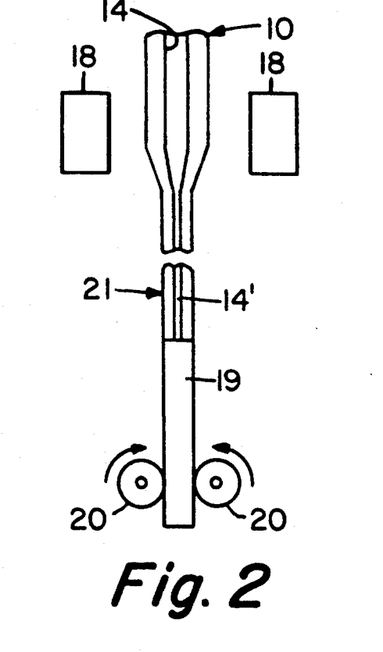
FIG. 2 is a schematic diagram illustrating the drawing of a rod from a grooved core preform.

The consolidated preform is inserted into the draw apparatus of FIG. 2 where a vacuum connection is affixed to its upper end, and the bottom tip is heated. The lower end of the preform is pulled downwardly at a rate sufficient to form an elongated solid rod having a diameter just large enough to fit into holes 58.

Examples 1 and 2, which are set forth below illustrate the manner in which the method of the present invention can be employed to produce polarization retaining single-mode optical fibers. Optical fiber core preforms for both examples were formed by a method similar to that disclosed in U.S. Pat. No. 4,486,212 which is incorporated herein by reference.

Referring to FIG. 15, the large diameter end of an alumina mandrel 87 was inserted into glass tube 88 having protrusions 89. The outside diameter of the mandrel tapered from 5.5 mm to 6.5 mm over its 107 cm length. The ends of mandrel 87 were mounted in a lathe where it was rotated and translated.

Figure 16:
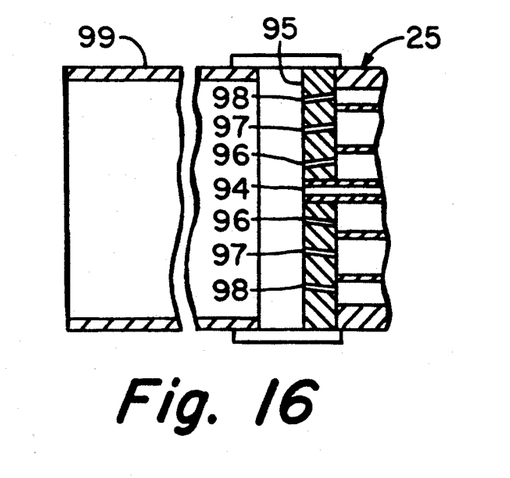
FIG. 16 is a fragmentary cross-sectional view of a conventional flame hydrolysis burner.

The face of burner 25, shown in greater detail in FIG. 16, was positioned 13.7 cm from mandrel 87. Orifice 94, centrally located in burner face 95, is surrounded by concentric rings of orifices 96, 97 and 98. Reactant compounds emanate from orifice 94 where they are heated by a flame produced by fuel gas and oxygen emanating from orifices 97. The reactant compounds oxidize in the flame to form glass particle stream 26 which is directed toward mandrel 87. An "inner shield" of oxygen emanates from orifices 96 to prevent the reaction of reactant compounds at the burner face. An "outer shield" stream of oxygen emanates from orifices 98. This burner design is somewhat similar to that disclosed in U.S. Pat. No. 3,698,936 issued to H.J. Moltzan, the Moltzan patent differing in that it teaches an annular slot for providing the inner shield stream and in that it lacks the outer shield orifices. All of the orifices of burner 25 are supplied by manifolds in a manner similar to that taught in the Moltzan patent. The axes of orifices 96, 97 and 98 are slightly angled or focused so gases emanating therefrom are directed toward the reactant compounds emanating from orifice 94. Shield 99, which is spaced a short distance from face 95, protects the soot stream from ambient air currents and improves laminar flow.

Auxiliary burners 90 directed flames toward the ends of the porous glass preform during deposition. The use of auxiliary burners is taught in U.S. Pat. No. 4,810,276.

The system for delivering the gas-vapor mixture to the burner was similar to that disclosed in U.S. Pat. No. 4,314,837. Liquid $SiCl_4$ was maintained at 79° C. in a first container, and liquid $GeCl_4$ was maintained at 100° C. in second container, thus producing vapor at about 20 psi. During the deposition of coatings 91 and 92, vapors were metered from the first and second containers and were premixed with oxygen before being supplied to burner orifice 94. The burner traversed a 49 cm section of mandrel 87 in 25 seconds.

An acetylene torch supported on the burner was first employed to deposit carbon particles on the mandrel during one burner pass to facilitate removal of the porous preform. A porous core preform 93 was then formed by traversing burner 25 along mandrel 87 for 400 minutes. Each coating was formed by traversing the mandrel many times with respect to burner 25 to cause a build-up of many layers of soot. The burner made additional passes in the vicinity of protrusions 89 in order to strengthen the bond between the tube and preform. Core region 92 was formed by depositing soot for 160 minutes. During this time, SiO$_2$ flowed to burner 25 at a rate of 4 slpm and GeO$_2$ flowed at a rate of 0.47 slpm. Coating 91 was formed by flowing only SiCl$_4$ to the burner at a rate of 4 slpm for the next 240 minutes.

The preform was removed from the lathe, and the mandrel was removed through tube 88, thereby leaving a longitudinal aperture in the porous preform. Protrusions 89 caused tube 88 to adhere to the preform; that tube remained at one end of the preform to provide support for subsequent processing. The preform was then dried and consolidated in accordance with the teachings of U.S. Pat. No. 4,125,388 (Powers 2A). A gas conducting handle was flameworked to the end of tube 88. A short length of capillary tube was inserted into bottom of the porous preform aperture. A drying gas consisting of 5 volume percent chlorine and 95 volume percent helium was flowed through the handle and tube 88 and into the preform aperture. A helium flushing gas flowed upwardly through the consolidation furnace muffle. The preform was gradually lowered into a consolidation furnace muffle, thereby forming a consolidated preform having a diameter of 52 mm and a core clad ratio of 0.4.

The consolidated preform was inserted into the draw apparatus of FIG. 2 where its tip was heated to 1900° C. while a vacuum connection was affixed to its upper end. After the end of preform 36 was stretched so that its aperture was either very narrow or completely closed, the aperture was evacuated. As the lower end of the preform was pulled downwardly at a rate of about 15 cm/min, and its diameter decreased, the evacuated aperture collapsed. The diameter of the resultant rod was 12 mm.

A plurality of 90 cm sections were severed from the rod, and one of the sections was supported in a lathe where it functioned as a mandrel for the deposition of additional silica cladding soot. This outer cladding was formed by flowing SiCl$_4$ vapor to the burner at a rate of 2 slpm for 300 minutes. This overclad process continued until a coating of SiO$_2$ soot having an outside diameter of 70 mm was deposited to form a composite preform. The composite preform was consolidated at 1450° while a mixture of 98.75 volume percent helium and 1.25 volume percent chlorine flowed upwardly through the muffle. The resultant consolidated core preform had a diameter of 38 mm.

The resultant single-mode core preform 10 is shown in FIG. 1. A grinding wheel was employed to form 1.3 cm wide by 6 mm deep longitudinally-extending grooves 14 in cladding 12 on opposite sides of core 11. The grooved core preform was inserted into the apparatus of FIG. 2 where its tip was heated to 1900° C. Grooved rod 21, having an outside diameter of 19.2 mm, was drawn from preform 10. Rod 21 was severed into 30 cm sections 22 which were cleaned with HF for 20 minutes and rinsed in deionized water.

One end of a 100 cm long piece of silica cladding tube 27 having a 20 mm inside diameter and 25 mm outside diameter was tapered at end 29 (as shown in FIG. 4), and silica plug 30 was fused to the tapered end. The ends of the resultant structure were mounted in a lathe where it was rotated and translated with respect to flame hydrolysis burner 25 (FIG. 3). Particles 26 of SiO$_2$ soot entrained in the burner flame were deposited on tube 27 to build up a 1000 gram coating 28 having a length of 70 cm and a outside diameter of 70 mm. The grooved core preform 22 was inserted into the opposite end of tube 27 until it contacted the tapered end. About 40 cm of tube 27 extended beyond the grooved core section 22. End 34 of tube 27 was tapered and was then fused to handle 35. While assembly 32 was rotated at 1 rpm, it was lowered into consolidation furnace muffle 31 at a rate of 5 mm per minute. During consolidation, assembly 32 was subjected to a temperature of 1460° C., and a gas mixture comprising 400 cc chlorine and 20 lpm helium flowed upwardly through the muffle.

Soot coating 28 consolidated; tube 27 was forced inwardly against section 22, and the contacting surfaces became fused. Planar endface 43 (FIG. 6) was formed by severing an end from the resultant consolidated preform. Tapered region 34 (FIG. 4) was severed from handle 35 and was fused to gas-conducting handle 44 of FIG. 6.

Consolidated assembly 38 was lowered into consolidation furnace muffle 31 at a rate of 5 mm/min while NF$_3$ flowed into the top of tube 27 from tube 53 at a rate of 1 slpm. That region of assembly 38 that was located in the furnace hot zone was heated it to about 1200° C. This etching step resulted in a preform 56 having 12 mm diameter holes. This type of preform was employed in Examples 1 and 2.

Apparatus similar to that described above in conjunction with FIG. 15 was employed to make the stress rods. A tapered alumina mandrel was inserted into a glass tube 88 as described above, and the ends of the mandrel were mounted in a lathe. The face of burner 25 was positioned 24 cm from the mandrel. The flow rates of CH$_4$ and oxygen from burner orifices 97 were 7 slpm and 1.6 slpm, respectively, as compared to conventional flow rates of about 10 slpm and 6 slpm, respectively. Oxygen flowed from the inner and outer shield orifices at 1.6 slpm, 1.2 slpm, respectively. The burner traversed the mandrel at a rate of 1.6 cm/sec in one direction; its return speed was 20 cm/sec. When the normal traverse speed (1.6 cm/sec) was used in both directions, ripples were produced. Borosilicate glass compositions containing around 25 wt. % B$_2$O$_3$ readily sinter during laydown. The burner traverse rate, burner-to-mandrel distance and flame gas flows specified above provide relatively cool laydown conditions which preclude sintering.

Process features such as the initial deposition of a particulate carbon parting layer and the use of auxiliary burners are described above.

Vapors from a 79° C. container of liquid SiCl$_4$ flowed to the burner at a rate of 2 slpm during the entire 345 minute run. The B$_2$O$_3$ initially flowed to the burner at a rate of 0.6 slpm, and its flow was linearly ramped to 1.1 slpm during a 65 minute period, after which its flow rate remained constant over the remaining 280 minutes of the run.

The preform was removed from the lathe, and the mandrel was removed through tube 88, thereby leaving a longitudinal aperture in the porous preform. A gas conducting handle was flameworked to the end of tube 88. The preform was then lowered into position in the muffle of a scanning consolidation furnace. A drying gas consisting of 1 slpm helium and 100 sccm chlorine flowed through the handle and into the preform aperture. A muffle gas consisting of 20 slpm helium flowed upwardly through the consolidation furnace muffle. A hot zone of approximately 1020° C. scanned upwardly along the preform at a rate of 6 cm/min, thereby forming a consolidated preform having a diameter of 34 mm.

After the consolidation cycle, the consolidated preform was raised about 30 cm, and 1 slpm NF$_3$ flowed through the aperture for 4 minutes to remove a thin layer of material from the surface of the aperture. The consolidated preform was then lowered to the original consolidation position of the furnace, and a gas mixture comprising 75 sccm SF$_6$ and 120 sccm O$_2$ flowed through the aperture. During this SF$_6$ etch, the hot zone of approximately 1040° C. scanned the preform at 10 mm/min.

The consolidated, etched preform was removed from the consolidation furnace and inserted into the draw apparatus of FIG. 2 where a vacuum connection was affixed to its upper end, and its tip was heated to approximately 1350° C. The evacuated aperture closed as the preform was stretched. The lower end of the preform was pulled downwardly at a rate sufficient to form an elongated rod. Rods having diameters just large enough to fit into 12 mm holes (for Example 1) and 7.8 mm holes (for Example 2) were formed.

EXAMPLE 1

Two 16 cm long stress rods 62 were severed from the elongated rod. Each rod was provided with a graded TCE extension as follows. Rods A and B were formed of SiO$_2$ doped with 15 wt. % B$_2$O$_3$ and 7 wt. % B$_2$O$_3$, respectively. Rods A and B had the same diameter as the stress rods. Rod A was fused to the end of rod 62, and the attached rod was scored and broken to provide a section 63 that was 4 mm long. This process was repeated at the other end of rod 62 to form a similar section 64. Rod B was fused to section 63, and it was severed to form a rod 65 having a length of 3 cm. The process was repeated to attach a 6 cm long piece of rod B to section 64.

Rods 62 were inserted into holes 58 until the ends of rods 65 were flush with endface 43'. A flame was directed onto opposite sides of tube 27, causing it to deform inwardly and fuse to regions 68 of rods 66. The resultant assembly was dried by placing it in a 240° C. oven for about 13 minutes.

The resultant draw blank was inserted in a draw furnace, and a vacuum attachment was connected to its handle. The draw blank was moved downwardly at a rate of 30 cm/min through the 2050° hot zone to form a solid blank in which the stress rods were fused to the walls of holes 58. The draw blank was then rapidly brought back through the hot zone to the top of the muffle. This insertion step was repeated to ensure the formation of a solid blank that was substantially free from voids.

While the furnace temperature remained at 2050° C., a polarization retaining single-mode optical fiber was drawn.

The resultant fiber had a core diameter of 5.8 μm and an outside diameter of 80 μm. The stress rod diameter was 22 μm, and the distance between each stress rod and core 68 was 2.9 μm. The attenuation of the fiber was 0.8 dB/km at 1550 nm. The beat length was 2.5 mm and the h parameter was equal to or less than $1 \times 10^{-5}$.

EXAMPLE 2

A preform 56 was inserted into the draw apparatus of FIG. 2 where it was stretched to about twice its original length, whereby holes 58 were reduced in diameter to about 7.8 mm, and the preform diameter was reduced to about 25 mm. The tube at the end of the preform (see tube 27 of FIG. 6) was removed, whereby it had two planar endfaces. A 6 cm long silica rod was inserted into the longitudinal center of each hole. A flame was directed onto the preform at the center of the rods, and the two ends were pulled in opposite directions to stretch and sever the preform into two modified preforms 61' (see FIG. 14). Two 14 cm long stress glass rods were inserted into holes 58', and rods 66' were then inserted. The endfaces of rods 66' were flush with endface 67'. A flame was directed onto the interface between each rod 66' and endface 67' to tack the rod to the endface and prevent it from moving longitudinally. A tapered end tube and evacuation handle were attached to endface 67', and the resultant assembly was dried by placing it in a 250° C. oven for about 13 minutes.

The resultant draw blank was inserted into a draw furnace, and a vacuum attachment was connected to its handle. The draw blank was moved downwardly at a rate of 5 cm/min through the 1750° C. hot zone to form a solid blank in which the stress rods were fused to the walls of holes 58. The draw blank was then rapidly brought back through the hot zone to the top of the muffle. This insertion step was repeated to ensure the formation of a solid blank that was substantially free from voids.

The furnace temperature was raised to 2150° C., and a 80 μm outside diameter polarization retaining single-mode optical fiber was drawn. This fiber exhibited attenuation and polarization characteristics similar to those of the fiber produced by Example 1.

We claim:

1. A method of making a polarization retaining single-mode optical fiber comprising the steps of
    forming longitudinal grooves on diametrically opposed sides of a cylindrically-shaped core preform having a glass core surrounded by cladding glass, said grooves extending into said cladding glass and being spaced from said core,
    inserting said core preform into a glass tube to form an assembly having longitudinal apertures in said cladding glass on diametrically opposed sides of said core,
    shrinking said tube onto said core preform, thereby forming a solid preform having longitudinal apertures in said cladding glass on opposite sides of said core,
    inserting into each of said apertures a stress rod of glass having a coefficient of expansion different from that of said cladding glass, and
    drawing the resultant draw blank to form an optical fiber.

2. A method of making a polarization retaining single-mode optical fiber comprising the steps of
    forming longitudinal grooves on diametrically opposed sides of a cylindrically-shaped core preform having a glass core surrounded by cladding glass, said grooves extending into said cladding glass and being spaced from said core,
    inserting said core preform into a glass tube to form an assembly having longitudinal apertures in said cladding glass on diametrically opposed sides of said core,
    shrinking said tube onto said core preform, thereby forming a solid preform having longitudinal apertures in said cladding glass on opposite sides of said core, fusing said core preform to said tube at the interface therebetween, thereby forming a consolidated assembly having longitudinal apertures that are parallel to said core, enlarging the cross-sectional area of the apertures of said consolidate assembly, inserting into each of the enlarged apertures a stress rod of glass having a coefficient of expansion different from that of said cladding glass, and drawing the resultant draw blank to form an optical fiber.

3. A method according to claim 2 wherein the step of enlarging comprises flowing an etchant through said apertures.

4. A method according to claim 3 wherein the step of flowing is continued for a period of time sufficient to enlarge said apertures and change the cross-sectional shape of said apertures to a substantially circular shape, the step of inserting comprising inserting round stress rods.

5. A method according to claim 4 wherein the step of flowing comprises heating said tube and flowing a gas phase etchant through said apertures.

6. A method of making a polarization retaining single-mode optical fiber comprising the following steps performed in the order in which they are set forth:

forming longitudinal grooves on diametrically opposed sides of a cylindrically-shaped core preform having a glass core surrounded by cladding glass, said grooves extending into said cladding glass and being spaced from said core, inserting said core preform into a glass tube to form an assembly having longitudinal apertures in said cladding glass on diametrically opposed sides of said core, shrinking said tube onto said core preform, thereby forming a solid preform having longitudinal apertures in said cladding glass on opposite sides of said core, inserting into each of said apertures a stress rod of glass having a coefficient of expansion different from that of said cladding glass, evacuating the space between said stress rods and the surface of said cladding glass that forms said apertures, heating said draw blank to fuse each of said stress rods to the surface of the aperture into which it has been inserted, and thereafter drawing the resultant draw blank to form an optical fiber.

7. A method of making a polarization retaining single-mode optical fiber comprising the following steps performed in the order in which they are set forth:

forming longitudinal grooves on diametrically opposed sides of a cylindrically-shaped core preform having a glass core surrounded by cladding glass, said grooves extending into said cladding glass and being spaced from said core, inserting said core preform into a glass tube to form an assembly having longitudinal apertures in said cladding glass on diametrically opposed side of said core, shrinking said tube onto said core preform, fusing said core preform to said tube at the interface therebetween, thereby forming a consolidated assembly having longitudinal apertures that are parallel to said core, inserting into each of said apertures a stress rod of glass having a coefficient of expansion different from that of said cladding glass, and drawing the resultant draw blank to form an optical fiber.

8. A method of making a polarization retaining single-mode optical fiber comprising the steps of forming longitudinal grooves on diametrically opposed sides of a cylindrically-shaped core preform having a glass core surrounded by cladding glass, said grooves extending into said cladding glass and being spaced from said core, inserting said core preform into a glass tube to form an assembly having longitudinal apertures in said cladding glass on diametrically opposed sides of said core, heating the assembly formed by inserting said core preform into said tube, and applying a differential pressure across said tube whereby the pressure on the outer tube surface exceeds that on the inner tube surface, whereby said tube shrinks onto and fuses to said core preform to form a consolidated assembly having longitudinal apertures that are parallel to said core, inserting into each of said apertures a stress rod of glass having a coefficient of expansion different from that of said cladding glass, and drawing the resultant draw blank to form an optical fiber.

9. A method of making a polarization retaining single-mode optical fiber comprising the steps of forming longitudinal grooves on diametrically opposed sides of a cylindrically-shaped core preform having a glass core surrounded by cladding glass, said grooves extending into said cladding glass and being spaced from said core, inserting said core preform into a glass tube to form an assembly having longitudinal apertures in said cladding glass on diametrically opposed sides of said core, depositing a coating of glass particles on the outer surface of said tube to form a coated assembly, heating said coated assembly to consolidate said particles, the consolidation of said particles exerting a force radially inwardly on said tube, said tube shrinking onto and fusing to said core preform, thereby forming a solid preform having longitudinal apertures in said cladding glass on opposite sides of said core, inserting into each of said apertures a stress rod of glass having a coefficient of expansion different from that of said cladding glass, and drawing the resultant draw blank to form an optical fiber.

10. A method of making a polarization retaining single-mode optical fiber comprising the steps of forming longitudinal grooves on diametrically opposed sides of a cylindrically-shaped core preform having a glass core surrounded by cladding glass, said grooves extending into said cladding glass and being spaced from said core, inserting said core preform into a glass tube to form an assembly having longitudinal apertures in said cladding glass on diametrically opposed sides of said core, shrinking said tube onto said core preform, thereby forming a solid preform having longitudinal apertures in said cladding glass on opposite sides of said core, inserting into each aperture a stress rod of glass having a coefficient of expansion different from that of said cladding glass, said stress rods being shorter than said apertures, inserting into each aperture at each end of a stress rod a length of glass plug, attaching said plugs to said draw blank to prevent said stress rods from melting and flowing from said apertures during the step of drawing, and drawing the resultant draw blank to form an optical fiber.

11. A method of making a polarization retaining single-mode optical fiber comprising the steps of forming longitudinal grooves on diametrically opposed sides of a cylindrically-shaped core preform having a glass core surrounded by cladding glass, said grooves extending into said cladding glass and being spaced from said core, inserting said core preform into a glass tube to form an assembly having longitudinal apertures in said cladding glass on diametrically opposed sides of said core, shrinking said tube onto said core preform, thereby forming a solid preform having longitudinal apertures in said cladding glass on opposite sides of said core, providing a pair of stress rods of glass having a coefficient of expansion different from that of said cladding glass, forming a composite rod by attaching to each end of each of said stress rods a glass plug, the thermal coefficient of expansion of which is intermediate that of said cladding glass and said stress rod, inserting one of said composite rods into each of said apertures, the length of each stress rod being such that a portion of each of said plugs is within its corresponding apertures, attaching said plugs to said draw blank to prevent said stress rods from melting and flowing from said apertures during the subsequent step of drawing, and drawing the resultant draw blank to form an optical fiber.

12. A method of making polarization retaining single-mode optical fiber comprising the steps of forming longitudinal grooves on diametrically opposed sides of a cylindrically-shaped core preform having a glass core surrounded by cladding glass, said grooves extending into said cladding glass and being spaced from said core, inserting said core preform into a glass tube to form an assembly having longitudinal apertures in said cladding glass on diametrically opposed sides of said core, depositing a coating of glass particles on the outer surface of said tube to form a coated assembly, heating said coated assembly to consolidate said particles, the consolidation of said particles exerting a force radially inwardly on said tube, causing said heated tube to shrink onto and fuse to said core preform, thereby forming a consolidated assembly having longitudinal apertures in said cladding glass that are parallel to said core, inserting into each of said apertures a stress rod of glass having a coefficient of expansion different from that of said cladding glass, and drawing the resultant draw blank to form an optical fiber.

13. A method of making a polarization retaining single-mode optical fiber comprising the following steps performed in the order in which they are set forth:

forming longitudinal grooves on diametrically opposed sides of a cylindrically-shaped core preform having a glass core surrounded by cladding glass, said grooves extending into said cladding glass and being spaced from said core, inserting said core preform into a glass tube to form an assembly having longitudinal apertures in said cladding glass on diametrically opposed sides of said core, shrinking said tube onto said core preform, fusing the interface between said core preform and said tube, thereby forming a consolidated assembly having longitudinal apertures in said cladding glass that are parallel to said core, inserting into each of said apertures a stress rod of glass having a coefficient of expansion different from that of said cladding glass, and drawing the resultant draw blank to form an optical fiber.

14. A method according to claim 13 wherein, prior to the step of drawing, said method comprises evaluating the space between said stress rods and the surface of said cladding glass that forms said apertures, and heating said draw blank to fuse each of said stress rods to the surface of the aperture into which it has been inserted.

15. A method according to claim 13 further comprising the step of maintaining said preform at an elevated temperature, flowing a gas phase etchant through said apertures, the step of flowing being continued for a period of time sufficient to enlarge said apertures and change the cross-sectional shape of said apertures to a substantially circular shape, the step of inserting comprising inserting round stress rods.

16. A method according to claim 15 wherein, prior to the step of drawing, said method comprises evacuating the space between said stress rods and the surface of said cladding glass that forms said apertures, and heating said draw blank to fuse each of said stress rods to the surface of the aperture into which it has been inserted.

17. A method according to claim 15 wherein, the step of drawing comprises inserting said draw blank into the entrance region of a furnace, evacuating the space between said stress rods and the surface of said cladding glass that forms said apertures, passing said draw blank through the furnace hot zone at a rate fast enough to prevent substantial elongation of said draw blank, the rate of insertion and the temperature of said hot zone being sufficient to fuse each of said stress rods to the surface of the aperture into which it has been inserted, withdrawing said draw blank to said entrance zone, increasing the temperature of said hot zone to the draw temperature of the materials of said draw blank, inserting an end of said draw blank into said hot zone, and drawing a fiber from said draw blank.

18. A method according to claim 15 wherein the step of inserting comprises inserting into each aperture a stress rod that is shorter than said aperture, inserting into each aperture at each end of a stress rod a length of glass plug, and attaching said plug to said draw blank to prevent said stress rod from melting and flowing from said aperture during the step of drawing.

19. A method according to claim 15 wherein the step of inserting comprises inserting into each aperture a composite rod formed by attaching to each end of said stress rod a glass plug, the thermal coefficient of expansion of which is intermediate that of said cladding glass and said stress rod, inserting said composite rod into said aperture, the length of said stress rod being such that at least a portion of each of said plugs is within said aperture, and attaching said plugs to said draw blank to prevent said stress rod from melting and flowing from said aperture during the step of drawing.

20. A method of making a polarization retaining single-mode optical fiber comprising the steps of providing a preform having a glass core surrounded by cladding glass, a pair of longitudinal apertures in said cladding glass on opposite sides of said core, said apertures being spaced from said core, inserting into each of said apertures a stress rod of glass having a coefficient of expansion different from that of said cladding glass, thereby forming a draw blank, evacuating the space between said stress rods and the surface of said cladding glass that forms said apertures, fusing each of said stress rods to the surface of the aperture into which it has been inserted, and thereafter drawing the resultant draw blank to form an optical fiber.

21. A method according to claim 20 wherein the steps of fusing and drawing comprise inserting said draw blank into the entrance region of a fiber draw furnace, passing said draw blank downwardly through the furnace hot zone at a rate fast enough to prevent substantial elongation of said draw blank, the rate of insertion and the temperature of said hot zone being sufficient to fuse each of said stress rods to the surface of the aperture into which it has been inserted, withdrawing said draw blank to said entrance zone, increasing the temperature of said hot zone to the draw temperature of the materials of said draw blank, inserting an end of said draw blank into said hot zone, and drawing a fiber from said draw blank.

22. A method according to claim 20 wherein the step of inserting comprises inserting into each aperture a stress rod that is shorter than said aperture, inserting into each aperture at each end of a stress rod a length of glass plug, and attaching said plug to said draw blank to prevent said stress rod from melting and flowing from said aperture during the step of drawing.

23. A method according to claim 20 wherein the step of inserting comprises inserting into each aperture a composite rod formed by attaching to each end of said stress rod a glass plug, the thermal coefficient of expansion of which is intermediate that of said cladding glass and said stress rod, inserting said composite rod into said aperture, the length of said stress rod being such that at least a portion of each of said plugs is within said aperture, and attaching said plugs to said draw blank to prevent said stress rod from melting and flowing from said aperture during the step of drawing.

24. A method of making a polarization retaining single-mode optical fiber comprising the steps of providing a cylindrically-shaped core preform having a glass core surrounded by cladding glass and longitudinal grooves extending into said cladding glass on diametrically opposed sides said core, said grooves being spaced from said core, providing a glass tube, providing a pair of glass stress rods having a coefficient of expansion different from that of said cladding glass, forming an assembly in which said tube surrounds said core preform, said grooves and the inner surface of said tube coacting to form longitudinal apertures in which said stress rods are disposed, and drawing the resultant draw blank to form an optical fiber.

* * * * *